(12) United States Patent
Yin et al.

(10) Patent No.: US 10,542,289 B2
(45) Date of Patent: Jan. 21, 2020

(54) SIGNAL RESHAPING AND CODING FOR HDR AND WIDE COLOR GAMUT SIGNALS

(71) Applicant: Dolby Laboratories Licensing Corporation, San Francisco, CA (US)

(72) Inventors: Peng Yin, Ithaca, NY (US); Taoran Lu, Santa Clara, CA (US); Fangjun Pu, Sunnyvale, CA (US); Tao Chen, Palo Alto, CA (US); Walter J. Husak, Simi Valley, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 15/580,246

(22) PCT Filed: Jul. 14, 2016

(86) PCT No.: PCT/US2016/042229
§ 371 (c)(1),
(2) Date: Dec. 6, 2017

(87) PCT Pub. No.: WO2017/011636
PCT Pub. Date: Jan. 19, 2017

(65) Prior Publication Data
US 2018/0167637 A1    Jun. 14, 2018

Related U.S. Application Data

(60) Provisional application No. 62/237,852, filed on Oct. 6, 2015, provisional application No. 62/193,508, filed on Jul. 16, 2015.

(51) Int. Cl.
*H04N 19/70* (2014.01)
*H04N 19/186* (2014.01)
(Continued)

(52) U.S. Cl.
CPC ............. *H04N 19/70* (2014.11); *G06T 5/007* (2013.01); *H04N 19/186* (2014.11); *H04N 19/85* (2014.11); *G06T 2207/20208* (2013.01)

(58) Field of Classification Search
CPC .......... G06T 2207/20208; G06T 5/007; H04N 19/186; H04N 19/30; H04N 19/70; H04N 19/85; H04N 19/98
See application file for complete search history.

(56) References Cited

U.S. PATENT DOCUMENTS 9,077,994 B2    7/2015 Miller
10,219,007 B2 *  2/2019 Francois ................ H04N 19/70
(Continued)

FOREIGN PATENT DOCUMENTS

JP    2018-506938    3/2018
WO   2014/130343    8/2014
(Continued)

OTHER PUBLICATIONS

Yin, P. "Common Technologies and Architectures for HDR Coding" ISO/IEC JTC1/SC29/WG11 N15454 , Jun. 2016, Warsaw, PL.
(Continued)

*Primary Examiner* — Nathnael Aynalem

(57) ABSTRACT

In a method to improve the coding efficiency of high-dynamic range (HDR) images, a decoder parses sequence processing set (SPS) data from an input coded bitstream to detect that an HDR extension syntax structure is present in the parsed SPS data. It extracts from the HDR extension syntax structure post-processing information that includes one or more of a color space enabled flag, a color enhancement enabled flag, an adaptive reshaping enabled flag, a dynamic range conversion flag, a color correction enabled flag, or an SDR viewable flag. It decodes the input bitstream to generate a preliminary output decoded signal, and gen-
(Continued)

erates a second output signal based on the preliminary output signal and the post-processing information.

14 Claims, 4 Drawing Sheets

(51) Int. Cl.
*H04N 19/85* (2014.01)
*G06T 5/00* (2006.01)

(56) References Cited

U.S. PATENT DOCUMENTS

| | | | | |
|---|---|---|---|---|
| 2007/0223813 | A1* | 9/2007 | Segall | H04N 1/6027 |
| | | | | 382/166 |
| 2010/0085487 | A1* | 4/2010 | Sarkar | H04N 1/6005 |
| | | | | 348/649 |
| 2010/0283861 | A1* | 11/2010 | Tamagawa | G06T 5/007 |
| | | | | 348/222.1 |
| 2014/0301441 | A1* | 10/2014 | Wang | H04N 19/597 |
| | | | | 375/240.02 |
| 2015/0010059 | A1* | 1/2015 | Hattori | H04N 19/70 |
| | | | | 375/240.02 |
| 2015/0043637 | A1* | 2/2015 | Morigami | H04N 19/70 |
| | | | | 375/240.12 |
| 2015/0103925 | A1 | 4/2015 | Chen | |
| 2015/0245044 | A1* | 8/2015 | Guo | H04N 19/98 |
| | | | | 375/240.03 |
| 2017/0251211 | A1 | 8/2017 | Froehlich | |

FOREIGN PATENT DOCUMENTS

| | | |
|---|---|---|
| WO | 2014/204865 | 12/2014 |
| WO | 2016/172091 | 10/2016 |

OTHER PUBLICATIONS

Joshi, R. et al "High Efficiency Video Coding (HEVC) Screen Content Coding: Draft 3" 20th Meeting: Geneva, CH Feb. 10-17, 2015, pp. 1-563.

Minoo, K. et al "Description of the Exploratory Test Model (ETM) for HDR/WCG Extension of HEVC" 23rd Meeting: San Diego, USA, Feb. 19-26, 2016, pp. 1-4.

Baylon, D. et al "Test Model Draft for HDR Reshaping and Adaptation" MPEG Meeting, ISO/IEC JTC1/SC29, WG11 MPEG2015, Oct. 2015, Geneva, CH.

Itu-R BT.1886 "Reference Electro-Optical Transfer Function for Flat Panel Displays Used in HDTV Studio Production" Mar. 2011.

SMPTE ST 2084:2014 "High Dynamic Range EOTF of Mastering Reference Displays".

Ebner, F. et al. "Development and Testing of a Color Space (IPT) with Improved Hue Uniformity" The Sixth Color Imaging Conference: Color Science, Systems, and Applications, Scottsdale, Arizona, Nov. 1998, pp. 8-13.

* cited by examiner

SIGNAL RESHAPING AND CODING FOR HDR AND WIDE COLOR GAMUT SIGNALS

CROSS-REFERENCE TO RELATED APPLICATIONS

The present application claims the benefit of priority from U.S. Provisional Patent Application Ser. Nos. 62/193,508, filed on Jul. 16, 2015, and 62/237,852, filed on Oct. 6, 2015, both of which are incorporated herein by reference in their entirety.

TECHNOLOGY

The present invention relates generally to images. More particularly, an embodiment of the present invention relates to signal reshaping and coding of images with high dynamic range (HDR) and wide color gamut (WCG).

BACKGROUND

The development and adoption of international audio and video coding standards, such as MPEG-2, MPEG-4, H.264, and more recently H.265 (also known as HEVC), has been instrumental for the rapid development, adoption, and proliferation of standard-based devices and communication standards, such as DVD players, Bly-Ray players, and the ATSC and DVB standards for digital television broadcasting.

Display technologies being developed by Dolby Laboratories, Inc., and others are able to reproduce images having high dynamic range (HDR) and wide color gamut. Such displays can reproduce images that more faithfully represent real-word scenes than conventional displays of standard dynamic range (SDR).

As used herein, the term 'dynamic range' (DR) may relate to a capability of the human visual system (HVS) to perceive a range of intensity (e.g., luminance, luma) in an image, e.g., from darkest blacks (darks) to brightest whites (highlights). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image. As used herein, EDR may relate to a DR that spans 5 to 6 orders of magnitude. Thus while perhaps somewhat narrower in relation to true scene referred HDR, EDR nonetheless represents a wide DR breadth and may also be referred to as HDR.

In practice, images comprise one or more color components (e.g., luma Y and chroma Cb and Cr) wherein each color component is represented by a precision of n-bits per pixel (e.g., n=8). Using linear luminance coding, images where n≤8 (e.g., color 24-bit JPEG images) are considered images of standard dynamic range, while images where n>8 may be considered images of enhanced dynamic range. EDR and HDR images may also be stored and distributed using high-precision (e.g., 16-bit) floating-point formats, such as the OpenEXR file format developed by Industrial Light and Magic.

A reference electro-optical transfer function (EOTF) for a given display characterizes the relationship between color values (e.g., luminance) of an input video signal to output screen color values (e.g., screen luminance) produced by the display. For example, ITU Rec. ITU-R BT. 1886, "Reference electro-optical transfer function for flat panel displays used in HDTV studio production," (March 2011), which is included herein by reference in its entity, defines the reference EOTF for flat panel displays based on measured characteristics of the Cathode Ray Tube (CRT). Given a video stream, information about its EOTF is typically embedded in the bit stream as metadata. As used herein, the term "metadata" relates to any auxiliary information that is transmitted as part of the coded bitstream and assists a decoder to render a decoded image. Such metadata may include, but are not limited to, color space or gamut information, reference display parameters, and auxiliary signal parameters, as those described herein.

Most consumer desktop displays currently support luminance of 200 to 300 $cd/m^2$ or nits. Most consumer HDTVs range from 300 to 500 nits with new models reaching 1000 nits ($cd/m^2$). Such conventional displays thus typify a lower dynamic range (LDR), also referred to as a standard dynamic range (SDR), in relation to HDR or EDR. As the availability of HDR content grows due to advances in both capture equipment (e.g., cameras) and HDR displays (e.g., the PRM-4200 professional reference monitor from Dolby Laboratories), HDR content may be color graded and displayed on HDR displays that support higher dynamic ranges (e.g., from 1,000 nits to 5,000 nits or more). Such displays may be defined using alternative EOTFs that support high luminance capability (e.g., 0 to 10,000 nits). An example of such an EOTF is defined in SMPTE ST 2084:2014 "High Dynamic Range EOTF of Mastering Reference Displays," which is incorporated herein by reference in its entirety. In general, without limitation, the methods of the present disclosure relate to any dynamic range higher than SDR. As appreciated by the inventors here, improved techniques for the coding of high-dynamic range images are desired within the framework of existing coding standards, such as HEVC.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Messaging for signal reshaping and coding of high dynamic range (HDR) images is described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to the messaging for reshaping and coding of high-dynamic range images. In a method to improve the coding efficiency of high-dynamic range (HDR) images, a decoder parses sequence processing set (SPS) data from an input coded bitstream to detect that an HDR extension syntax structure is present in the parsed SPS data. It extracts from the HDR extension syntax structure post-processing information that includes one or more of a color space enabled flag, a color enhancement enabled flag, an adaptive reshaping enabled flag, a dynamic range conversion flag, a color correction enabled flag, or an SDR viewable flag. It decodes the input bitstream to generate a preliminary output decoded signal, and generates a second output signal based on the preliminary output signal and the post-processing information.

Example Video Delivery Processing Pipeline

Figure 1:
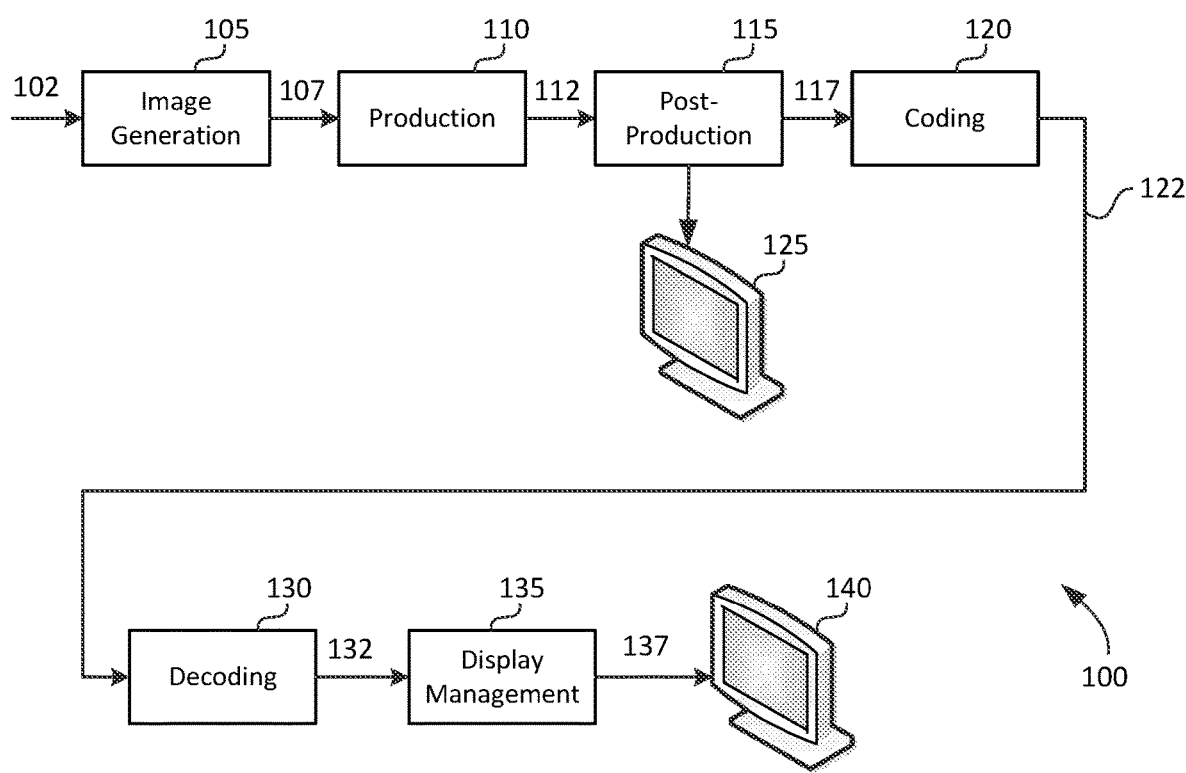
FIG. 1 depicts an example process for a video delivery pipeline.

FIG. 1 depicts an example process of a conventional video delivery pipeline (100) showing various stages from video capture to video content display. A sequence of video frames (102) is captured or generated using image generation block (105). Video frames (102) may be digitally captured (e.g. by a digital camera) or generated by a computer (e.g. using computer animation) to provide video data (107). Alternatively, video frames (102) may be captured on film by a film camera. The film is converted to a digital format to provide video data (107). In a production phase (110), video data (107) is edited to provide a video production stream (112).

The video data of production stream (112) is then provided to a processor at block (115) for post-production editing. Post-production editing (115) may include adjusting or modifying colors or brightness in particular areas of an image to enhance the image quality or achieve a particular appearance for the image in accordance with the video creator's creative intent. This is sometimes called "color timing" or "color grading." Other editing (e.g. scene selection and sequencing, image cropping, addition of computer-generated visual special effects, etc.) may be performed at block (115) to yield a final version (117) of the production for distribution. During post-production editing (115), video images are viewed on a reference display (125).

Following post-production (115), video data of final production (117) may be delivered to encoding block (120) for delivering downstream to decoding and playback devices such as television sets, set-top boxes, movie theaters, and the like. In some embodiments, coding block (120) may include audio and video encoders, such as those defined by ATSC, DVB, DVD, Blu-Ray, and other delivery formats, to generate coded bit stream (122). In a receiver, the coded bit stream (122) is decoded by decoding unit (130) to generate a decoded signal (132) representing an identical or close approximation of signal (117). The receiver may be attached to a target display (140) which may have completely different characteristics than the reference display (125). In that case, a display management block (135) may be used to map the dynamic range of decoded signal (132) to the characteristics of the target display (140) by generating display-mapped signal (137).

The IPT-PQ Color Space

Traditionally, video processing is performed in a gamma-coded Luminance/Chroma color space, such as YCbCr, YUV, and the like. In an embodiment, part of the processing pipeline, for example, coding (120), decoding (130), and display management (135) may be performed in what will be referred to as the IPT-PQ color space. The IPT-PQ color space was first introduced in PCT Application Ser. No. PCT/US2014/016304, filed on Feb. 13, 2014, (published as WO 2014/130343) for display management applications. IPT, as described in "*Development and testing of a color space (ipt) with improved hue uniformity*", by F. Ebner and M. D. Fairchild, in Proc. $6^{th}$ Color Imaging Conference: Color Science, Systems, and Applications, IS&T, Scottsdale, Ariz., November 1998, pp. 8-13 (to be referred to as the Ebner paper), which is incorporated herein by reference in its entirety, is a model of the color difference between cones in the human visual system. In this sense it is like the YCbCr or CIE-Lab color spaces; however, it has been shown in some scientific studies to better mimic human visual processing than these spaces. Like CIE-Lab, IPT is a normalized space to some reference luminance. In an embodiment, the normalization is based on the maximum luminance of a target display (e.g., 5,000 nits).

The term "PQ" as used herein refers to perceptual quantization. The human visual system responds to increasing light levels in a very non-linear way. A human's ability to see a stimulus is affected by the luminance of that stimulus, the size of the stimulus, the spatial frequency(ies) making up the stimulus, and the luminance level that the eyes have adapted to at the particular moment one is viewing the stimulus. In a preferred embodiment, a perceptual quantizer function maps linear input gray levels to output gray levels that better match the contrast sensitivity thresholds in the human visual system. Examples of PQ mapping functions are described in U.S. Pat. No. 9,077,994 (to be referred as the '994 patent) titled "Perceptual luminance nonlinearity-based image data exchange across different display capabilities," by J. S. Miller et al., and incorporated herein by reference in its entirety, parts of which have been adopted by the SMPTE ST 2084 specification, where given a fixed stimulus size, for every luminance level (i.e., the stimulus level), a minimum visible contrast step at that luminance level is selected according to the most sensitive adaptation level and the most sensitive spatial frequency (according to HVS models).

Compared to the traditional gamma curve, which represents the response curve of a physical cathode ray tube (CRT) device and coincidently may have a very rough similarity to the way the human visual system responds, a PQ curve, as determined by the '994 patent, imitates the true visual response of the human visual system using a relatively simple functional model.

Figure 2:
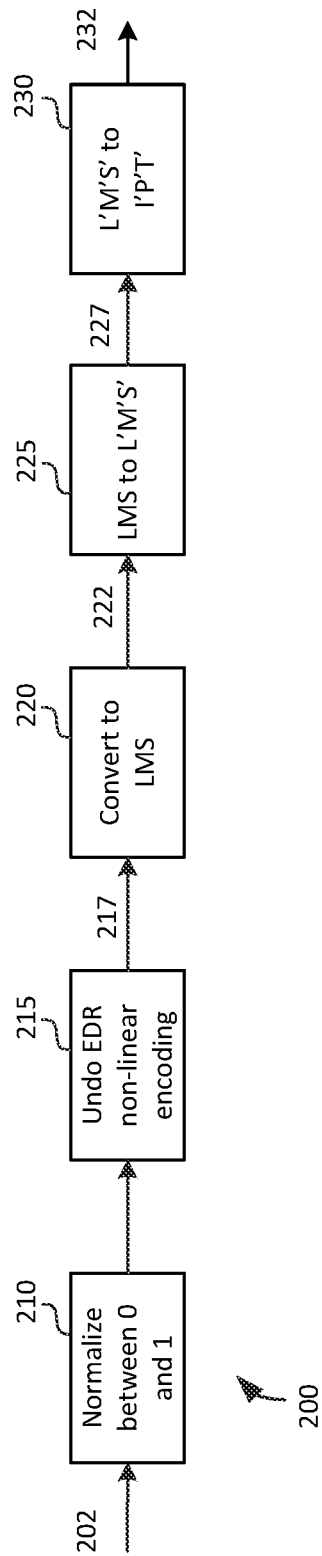
FIG. 2 depicts an example process color conversion to the IPT-PQ color space according to an embodiment of this invention.

FIG. 2 depicts in more detail an example process (200) for the color conversion into the IPT-PQ color space according to an embodiment. As depicted in FIG. 2, given input signal (202) which is in a first color space (e.g., RGB), the color space transformation in the perceptually-corrected IPT color space (IPT-PQ) may comprise the following steps:

a) Optional step (210) may normalize the pixel values of the input signal (202) (e.g., 0 to 4095) into pixel values with a dynamic range between 0 to 1.

b) If the input signal (202) is gamma-coded or PQ-coded (e.g., per BT. 1866 or SMPTE ST 2084), optional step (215) may use the signal's EOTF (as provided by signal metadata) to reverse or undo the source display's conversion from code values to luminance. For example, if the input signal is gamma coded, then this step applies an inverse gamma function. If the input signal is PQ-encoded according to SMPTE ST 2084, then this step applies an inverse PQ function. In practice, the normalization step (210) and the inverse non-linear encoding (215) may be performed using pre-computed 1-D Look-up tables (LUTs) to generate a linear signal 217.

c) In step (220), linear signal 217 is converted from its original color space (e.g., RGB, XYZ, and the like) into the LMS color space. For example, if the original signal is in RGB, then this step may comprise two steps: an RGB to XYZ color transformation and an XYZ to LMS color transformation. In an embodiment, without limitation, the XYZ to LMS transformation may be given by $$\begin{pmatrix} L \\ M \\ S \end{pmatrix} = \begin{pmatrix} 0.4002 & 0.7076 & -0.0808 \\ -0.2263 & 1.1653 & 0.0457 \\ 0 & 0 & 0.9182 \end{pmatrix} \begin{pmatrix} X \\ Y \\ Z \end{pmatrix}. \quad (1a)$$

In another embodiment, as described in PCT Patent Application Ser. No. PCT/US2015/051964, filed on Sep. 24, 2015, and titled "Encoding and decoding perceptually-quantized video content," which is incorporated herein by reference in its entirety, the overall coding efficiency in the IPT-PQ color space may be further increased if one incorporates a cross talk matrix $$\begin{pmatrix} 1-2c & c & c \\ c & 1-2c & c \\ c & c & 1-2c \end{pmatrix}$$

after the XYZ to LMS transformation. For example, for c=0.02, equation (1a) yields:

$$\begin{pmatrix} L \\ M \\ S \end{pmatrix} = \begin{pmatrix} 0.3797 & 0.7026 & -0.0583 \\ -0.2092 & 1.1329 & 0.0606 \\ 0.0035 & 0.0375 & 0.8808 \end{pmatrix} \begin{pmatrix} X \\ Y \\ Z \end{pmatrix} \quad (1b)$$

d) According to the Ebner paper, the traditional LMS to IPT color space conversion comprises applying first a non-linear power function to the LMS data and then applying a linear transformation matrix. While one can transform the data from LMS to IPT and then apply the PQ function to be in the IPT-PQ domain, in a preferred embodiment, in step (225) the traditional power function for a non-linear encoding of LMS to IPT is replaced with the PQ non-linear encoding of each one of the L, M, and S components.

e) Using an LMS to IPT linear transform (e.g., as defined in the Ebner paper), step (230) completes the conversion of signal 222 to the IPT-PQ color space. For example, in an embodiment, the L'M'S' to IPT-PQ transform may be given by $$\begin{pmatrix} I' \\ P' \\ T' \end{pmatrix} = \begin{pmatrix} 0.400 & 0.4000 & 0.2000 \\ 4.4550 & -4.8510 & 0.3960 \\ 0.8056 & 0.3572 & -1.1628 \end{pmatrix} \begin{pmatrix} L' \\ M' \\ S' \end{pmatrix}. \quad (2)$$

Forward Reshaping

Most of the existing video compression standards, such as MPEG-1, MPEG-2, AVC, HEVC, and the like, have been tested, evaluated, and optimized for gamma-coded, SDR images in the YCbCr color space; however, experimental results have shown that additional pre-processing may benefit the coding efficiency of HDR and WCG signals.

Figure 3:
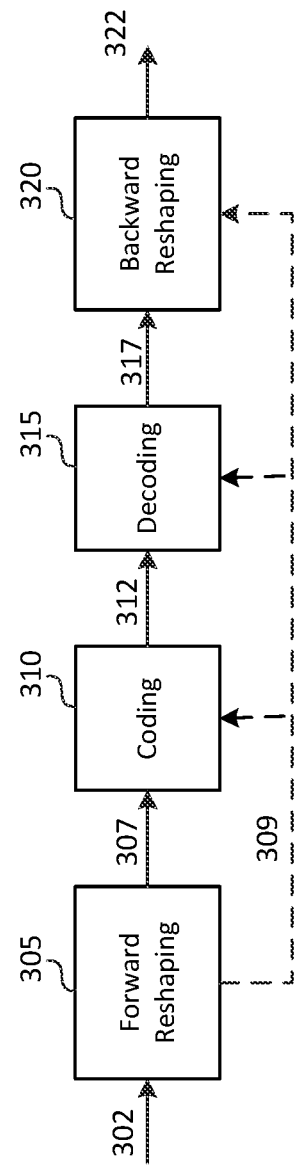
FIG. 3 depicts an example process for signal reshaping and coding according to an embodiment of this invention.

FIG. 3 depicts an example process for signal reshaping and coding for HDR and WCG signals according to an embodiment. As depicted in FIG. 3, given HDR input (302), the forward reshaping block (305) applies, as needed, color transformation and or reshaping functions to generate reshaped signal (307). Reshaping-related metadata (309) may also be generated and communicated to subsequent blocks of the coding pipeline, such as the encoder (310), the decoder (315), and backward reshaping (320).

In FIG. 3, before encoding (310), reshaped signal (307) may be pre-processed (not shown) according to the pre-processing requirements of encoder (310). Such pre-processing may include chroma sub-sampling, scaling, cropping, additional quantization, and other image processing operations known by those skilled in the art. In some embodiments, reshaping may also be performed after certain pre-processing operations (e.g., chroma sub-sampling). In a receiver, the coded bitstream (312) is decoded using decoder (315) and metadata (309) to generate a decoded signal (317). After decoding, block (320) applies backward reshaping and any necessary color transformations to translate the decoded signal (317) back to an unshaped signal for further processing, such as storage and/or display management.

Examples of reshaping functions are described in the WO 2014/204865 publication of the PCT Application Ser. No. PCT/US2014/042583, "Adaptive reshaping for layered coding of enhanced dynamic range signals," which is incorporated herein by reference in its entirety. For example, for PQ-coded signals, in an embodiment, a signal reshaping function in (305) may be expressed as:

$$s_i = \text{round}\left((c_H - c_L)\left(\frac{v_i - v_L}{v_H - v_L}\right)^\alpha + c_L\right), \quad (3)$$

where $v_L$ and $v_K$ denote the minimal value and maximal values in a color channel under consideration of the input HDR signal (302), and $c_L$ and $c_H$ denote the corresponding minimal and maximal output values. The value of a is constant, but may be adapted and changed on a per frame, per scene, or other suitable criterion basis.

Another reshaping function, specifically targeting the P and T chroma components of an input IPT-PQ signal is described in U.S. Provisional Patent Application Ser. No. 62/150,910, titled "Signal reshaping and coding in the IPT-PQ color space," by T. Lu et al., filed on Apr. 22, 2015, submitted also as PCT Application Ser. No. PCT/US2016/028261, filed on Apr. 19, 2016, each of which is incorporated herein by reference in its entirety.

Reshaping-related information may be signaled from an encoder to the rest of the pipeline in a number of alternative embodiments. For example, in one embodiment where coding (310) uses the HEVC Main 10 Profile, one may modify the existing syntax for the sequence parameter set (SPS) and/or the picture sequence set (SPS) to signal to the decoder information related to the forward reshaping function (e.g., a piece-wise linear or non-linear approximation of the backward or reverse reshaping (320) and the color space being used (e.g., YCbCr, XYZ, or IPT-PQ).

High Level Syntax

Consider, without loss of generality, a coding system (e.g., 310, 315) that uses the latest HEVC Draft Specification, "HEVC Screen Coding Draft Text 3," JCTVC-T1005, February 2015, Geneva, which is incorporated herein by reference in its entirety, for the coding (310) and decoding (315) of an HDR signal (302). In an embodiment, assuming there are no changes in the HEVC specification below the slice level, Table 1 depicts an example enhanced signaling at the Sequence Parameter Set (SPS) to support HDR and WCG video encoding according to an embodiment. Text marked in bold is in addition or modification of syntax presented in the HEVC specification.

TABLE 1

SPS Extensions for HDR coding

| seq_parameter_set_rbsp( ) { | Descriptor |
|---|---|
| sps_video_parameter_set_id | u(4) |
| ... | |
| if( sps_extension_present_flag ) { | |
| sps_range_extension_flag | u(1) |
| sps_multilayer_extension_flag | u(1) |
| sps_scc_extension_flag | u(1) |
| sps_hdrwcg_extension_flag | u(1) |
| sps_extension_4bits | u(4) |
| } | |
| if( sps_range_extension_flag ) | |
| sps_range_extension( ) | |
| if( sps_multilayer_extension_flag ) | |
| sps_multilayer_extension( ) | |
| if( sps_scc_extension_flag ) | |
| sps_scc_extension( ) | |
| if( sps_hdrwcg_extension_flag ) | |
| sps_hdrwcg_extension( ) | |
| if( sps_extension_4bits ) | |
| while( more_rbsp_data( ) ) | |
| sps_extension_data_flag | u(1) |
| rbsp_trailing_bits( ) | |
| } | | sps_hdrwcg_extension_flag equal to 1 specifies that the sps_hdrwcg_extension( ) syntax structure is present in the SPS RBSP syntax structure. sps_hdrwcg_extension_flag equal to 0 specifies that this syntax structure is not present. When not present, the value of sps_hdrwcg_extension_flag is inferred to be equal to 0.

sps_extension_4bits equal to 0 specifies that no sps_extension_data_flag syntax elements are present in the SPS RBSP syntax structure. When present, sps_extension_4bits shall be equal to 0 in bitstreams conforming to this version of this Specification. Values of sps_extension_4bits not equal to 0 are reserved for future use by ITU-T|ISO/IEC. Decoders shall allow the value of sps_extension_4bits to be not equal to 0 and shall ignore all sps_extension_data_flag syntax elements in an SPS NAL unit. When not present, the value of sps_extension_4bits is inferred to be equal to 0.

In an embodiment, function sps_hdrwcg_extension( ) indicates the basic tool sets included in an HDR and WCG profile. For example, the basic tools sets may include information related to the color space being used (say, YCbCr or IPT-PQ), color enhancement techniques, adaptive reshaping information, and HDR remapping and color correction information. In some embodiments, it may also include information related to HDR to SDR mapping used by the encoder so that a decoder may use it to generate an SDR version for an SDR-capable display. It can also indicate if the decoded bitstream is SDR viewable. Hence, the proposed syntax can support both a single layer HDR stream and a single or multi-layer stream that can be decoded by both SDR and HDR displays. Table 2 provides an example syntax according to an embodiment.

TABLE 2

Example syntax for sps_hdrwcg_extension( )

| sps_hdrwcg_extension( ) { | Descriptor |
|---|---|
| colour_space_enabled_flag | u(1) |
| colour_enhancement_enabled_flag | u(1) |
| adaptive_reshaping_enabled_flag | u(1) |
| dynamic_range_conversion_enabled_flag | u(1) |
| colour_correction_enabled_flag | u(1) |
| SDR_viewable_flag | u(1) |
| } | | colour_space_enabled_flag equal to 1 specifies that color space information is present. colour_space_enabled_flag equal to 0 specifies that no color space information is present. When present, it might override the value of color description (colour_primaries, transfer_characteristics and matrix_coeffs) in video usability information (VUI). When not present, the value of colour_space_enabled_flag is inferred to be equal to 0.

colour_enhancement_enabled_flag equal to 1 specifies that a colour enhancement process for the decoded pictures may be used in the coded video sequence (CVS). colour_enhancement_enabled_flag equal to 0 specifies that the colour enhancement process for the decoded pictures is not used in the CVS. When not present, the value of colour_enhancement_enabled_flag is inferred to be equal to 0.

In an embodiment, when colour_enhancement_enabled_flag=1, the bitstream (e.g., the sps_hdrwcg_extension( ) structure or pps_hdrwcg_extension( ) structure) may include additional information (e.g., filter coefficients) for post-processing to reduce quantization and down-sampling errors for chroma components to improve color performance.

adaptive_reshaping_enabled_flag equal to 1 specifies that an adaptive reshaping process for the decoded pictures may be used in the CVS. adaptive_reshaping_enabled_flag equal to 0 specifies that the adaptive reshaping process for the decoded pictures is not used in the CVS. When not present, the value of adaptive_reshaping_enabled_flag is inferred to be equal to 0.

dynamic_range_conversion_enabled_flag equal to 1 specifies that a dynamic range conversion process for the decoded pictures may be used in the CVS. dynamic_range_conversion_enabled_flag equal to 0 specifies that the dynamic range conversion process for the decoded pictures is not used in the CVS. When not present, the value of dynamic_range_conversion_enabled_flag is inferred to be equal to 0.

In an embodiment, when dynamic_range_conversion_enabled_flag=1, the bitstream (e.g., the sps_hdrwcg_extension( ) structure or the pps_hdrwcg_extension( ) structure) may include parameters from SMPTE ST 2094.

colour_correction_enabled_flag equal to 1 specifies that a color correction process for the decoded pictures may be used in the CVS. colour_correction_enabled_flag equal to 0 specifies that the color correction process for the decoded pictures is not used in the CVS. When not present, the value of colour_correction_enabled_flag is inferred to be equal to 0.

In an embodiment, when colour_correction_enabled_flag=1, the bitstream (e.g., the sps_hdrwcg_extension( ) structure or the pps_hdrwcg_extension( ) structure) may include parameters from SMPTE ST 2094.

SDR_viewable_flag equal to 1 specifies that the decoded picture is directly viewable on an SDR display. SDR_viewable_flag equal to 0 specifies that the decoded picture is not directly viewable on SDR display. When not present, the value of SDR_viewable_flag is inferred to be equal to 0.

Typically, color space is indicated at the sequence level. In some embodiments, it can be indicated in the VUI, so it might not be needed to be signaled in SPS extension. If signaled in the SPS extension, then signaling syntax elements may indicate the color space being used. As an example, in Table 2, one may replace the colour_space_enabled_flag with a colour_space_idc flag.

colour_space_idc equals to zero specifies the color space is indicated in VUI. colour_space_idc equals to one specifies the color space is IPT-PQ. colour_space_idc equals to two specifies the color space is Y"u"v", etc. When not present, the value of colour_space_idc is inferred to be equal to 0. An example of such an implementation is shown in Table 3.

TABLE 3

Example syntax for sps_hdrwcg_extension( )

| sps_hdrwcg_extension( ) { | Descriptor |
|---|---|
| colour_space_idc | u(8) |
| colour_enhancement_enabled_flag | u(1) |
| adaptive_reshaping_enabled_flag | u(1) |
| dynamic_range_conversion_enabled_flag | u(1) |
| colour_correction_enabled_flag | u(1) |
| SDR_viewable_flag | u(1) |
| } | |

In some embodiment, additional flags and parameters may provide explicit information related to color space transformations. For example, Table 4 depicts an example related to the IPT-PQ color space transformations.

TABLE 4

Example of Color Space signaling

| IPT-PQ_color_space_table( ) { | Descriptor |
|---|---|
| XYZtoLMS_matrix_present_flag | u(1) |
| if( XYZtoLMS_matrix_present_flag ) { | |
| for( c = 0; c < 3; c++ ) | |
| for( i = 0; i < 3; i++ ) | |
| XYZtoLMS_coeffs[ c ][ i ] | i(16) |
| } | |
| LMStoIPT_matrix_present_flag | u(1) |

TABLE 4-continued

Example of Color Space signaling

| IPT-PQ_color_space_table( ) { | Descriptor |
|---|---|
| if( LMStoIPT_matrix_present_flag ) { | |
| for( c = 0; c < 3; c++ ) | |
| for( i = 0; i < 3; i++ ) | |
| LMStoIPT_coeffs[ c ][ i ] | i(16) |
| } | |
| } | |

XYZtoLMS_matrix_present_flag equal to 1 indicates that the syntax elements XYZtoLMS_coeffs[c][i], for c and i in the range of 0 to 2, inclusive, are present. XYZtoLMS_matrix_present_flag equal to 0 indicates that the syntax elements XYZtoLMS_coeffs[c][i], for c and i in the range of 0 to 2, inclusive, are not present.

XYZtoLMS_coeffs[c][i] specifies the value of the three-by-three from color primary XYZ to color primary LMS matrix coefficients. The value of XYZtoLMS_coeffs[c][i] shall be in the range of $-2^{15}$ to $2^{15}-1$, inclusive. When XYZtoLMS_coeffs[c][i] is not present, the default XYZ to LMS matrix is used.

When XYZtoLMS_matrix_present_flag is equal to 0, the default XYZ to LMS matrix in floating point is specified as follows:

fp_XYZtoLMS_Matrix[3][3] =

{
{ 0.379702729270854 0.702595741823277 −0.058294843714358 }
{ −0.209241415246258 1.132854830780842 0.060621130953413 }
{ 0.003478802327033 0.037458174951104 0.880793856972993 }
}.

When XYZtoLMS_matrix_present_flag is equal to 1, the XYZ to LMS matrix in floating point is converted as follows:

$fp\_XYZtoLMS\_coeffs[c][i]$=(float)XYZtoLMS_coeffs[c][i]/(float)(1<<14).

Assuming MatrixInput denotes normalized XYZ input data within the range of [0, 1], inclusively, the LMS matrixOutput[c] for c=0, 1 and 2 is derived as follows:

matrixOutput[c]=Clip3(0,1,(fp_XYZtoLMS_coeffs[c][0]*matrixInput[0]+fp_XYZtoLMS_coeffs[c][1]*matrixInput[1]+fp_XYZtoLMS_coeffs[c][2]*matrixInput[2])).

LMStoIPT_matrix_present_flag equal to 1 indicates that the syntax elements LMStoIPT_coeffs[c][i], for c and i in the range of 0 to 2, inclusive, are present. LMStoIPT_matrix_present_flag equal to 0 indicates that the syntax elements LMStoIPT_coeffs[c][i], for c and i in the range of 0 to 2, inclusive, are not present.

LMStoIPT_coeffs[c][i] specifies the value of the three-by-three from LMS to IPT matrix coefficients. The value of LMStoIPT_coeffs[c][i] shall be in the range of $-2^{15}$ to $2^{15}-1$, inclusive. When LMStoIPT_coeffs[c][i] is not present, the default LMS to IPT matrix is used.

When LMStoIPT_matrix_present_flag is equal to 0, the default LMS to IPT matrix in floating point is specified as follows:

fp_LMStoIPT_Matrix[3][3] =

-continued

```
{
  { 0.400000000000000   0.400000000000000   0.200000000000000 }
  { 4.455000000000000  -4.851000000000000   0.396000000000000 }
  { 0.805600000000000   0.357200000000000  -1.162800000000000 }
}.
```

When LMStoIPT_matrix_present_flag is equal to 1, the LMS to IPT matrix in floating point is converted as follows:

$fp\_LMStoIPT\_coeffs[c][i]$=(float)LMStoIPT_coeffs$[c][i]$/(float)(1<<12).

Assuming MatrixInput is normalized LMS input data within the range of [0, 1], inclusively, the IPT matrixOutput[c] for c=0, 1 and 2 is derived as follows:

matrixOutput[c]=Clip3(0,1,($fp\_LMStoIPT\_coeffs[c]$[0]*matrixInput[0]+$fp\_LMStoIPT\_coeffs[c]$[1]*matrixInput[1]+$fp\_LMStoIPT\_coeffs[c]$[2]*matrixInput[2])).

In order to guarantee proper display of the HDR-decoded signal and adapt the signal not only on CVS (e.g, allowing scene/picture/slice level adaptation), additional signaling at the picture level, as indicated by an example in Table 5, is proposed.

TABLE 5

Example of Picture parameter set extensions for HDR WCG signals

| pic_parameter_set_rbsp( ) { | Descriptor |
|---|---|
| pps_pic_parameter_set_id | ue(v) |
| pps_seq_parameter_set_id | ue(v) |
| ... | u(1) |
| if( pps_extension_present_flag ) { | |
|   pps_range_extension_flag | u(1) |
|   pps_multilayer_extension_flag | u(1) |
|   pps_scc_extension_flag | u(1) |
|   pps_hdrwcg_extension_flag | u(1) |
|   pps_extension_4bits | u(4) |
| } | |
| if( pps_range_extension_flag ) | |
|   pps_range_extension( ) | |
| if( pps_multilayer_extension_flag ) | |
|   pps_multilayer_extension( ) | |
| if( pps_scc_extension_flag ) | |
|   pps_scc_extension( ) | |
| if( pps_hdrwcg_extension_flag ) | |
|   pps_hdrwcg_extension( ) | |
| if( pps_extension_4bits ) | |
|   while( more_rbsp_data( ) ) | |
|     pps_extension_data_flag | u(1) |
|   rbsp_trailing_bits( ) | |
| } | | pps_hdrwcg_extension_flag equal to 1 specifies that the pps_hdrwcg_extension( ) syntax structure is present in the PPS RBSP syntax structure. pps_hdrwcg_extension_flag equal to 0 specifies that this syntax structure is not present. When not present, the value of pps_hdrwcg_extension_flag is inferred to be equal to 0.

pps_extension_4bits equal to 0 specifies that no pps_extension_data_flag syntax elements are present in the PPS RBSP syntax structure. When present, pps_extension_4bits shall be equal to 0 in bitstreams conforming to this version of this Specification. Values of pps_extension_4bits not equal to 0 are reserved for future use by ITU T|ISO/IEC. Decoders shall allow the value of pps_extension_4bits to be not equal to 0 and shall ignore all pps_extension_data_flag syntax elements in a PPS NAL unit. When not present, the value of pps_extension_4bits is inferred to be equal to 0.

Each tool set might incorporate various options. Table 6 provides an example syntax for the adaptive_reshaping_idc mode describing adaptive reshaping when the adaptive_reshaping_enabled_flag is enabled (see Table 2). Similar syntax elements can be developed for other tools.

TABLE 6

Example of PPS extensions for specific HDR tools

| pps_hdrwcg_extension( ) { | Descriptor |
|---|---|
| if( adaptive_reshaping_enabled_flag ) { | |
|   adaptive_reshaping_idc | ue(v) |
|   if(adaptive_reshaping_idc == 0) { | |
|     signal_reshaping_table( ) /* reshaping idc 0 related syntax/ | |
|   } else if(adaptive_reshaping_idc == 1 ) { | |
|     /* reshaping idc 1 related syntax */ | |
|   } | |
| } | |
| if( colour_enhancement_enabled_flag ) { | |
|   /* colour enhancement related syntax */ | |
| } | |
| if( dynamic_range_conversion_enabled_flag ) { | |
|   /* dynamic range conversion related syntax */ | |
| } | |
| if(colour_correction_enabled_flag _enabled_flag ) { | |
|   /* colour correction related syntax */ | |
| } | |
| } | |

The signal adaptive_reshaping_idc indicates different reshaping techniques. As an example, Table 7 shows the syntax proposed in the '910 application. If HDR and SDR conversion is invertible, the reshaping syntax below should be able to signal the mapping from either SDR to HDR or HDR to SDR conversion. In an embodiment, the mapping may be expressed using one or more look-up tables (LUTs) or a multi-piece polynomial. This approach may eliminate the need to include the dynamic range conversion and color correction related syntax.

TABLE 7

Example syntax for signal reshaping

| signal_reshaping_table( ) { | Descriptor |
|---|---|
|   signal_reshape_input_bit_depth_minus8 | ue(v) |
|   signal_reshape_bit_depth_minus8 | ue(v) |
|   signal_reshape_full_range_flag | u(1) |
|   signal_reshape_model_present_flag | u(1) |
|   coef_log2_denom_minus14 | ue(v) |
|   for( c = 0; c < 3; c++ ) { | |
|     signal_reshape_model_id[ c ] | ue(v) |
|     signal_reshape_num_pivots_minus2 [ c ] | ue(v) |
|     for( i = 1; i < signal_reshape_num_pivots_minus2 [ c ] + 1 ; i++ ) { | |

TABLE 7-continued

Example syntax for signal reshaping

| signal_reshaping_table( ) { | Descriptor |
|---|---|
|     signal_reshape_coded_pivot_value[ c ][ i ] | u(v) |
|   } | |
|   for( i = 0; i < signal_reshape_num_pivots_minus2 [ c ] + 1; i++ ) { | |
|     if( signal_reshape_model_id[ c ] = = 0 ) { | |
|       poly_order_minus1[ c ][ i ] | ue(v) |
|       for( j = 0; j <= poly_order_minus1[ c ][ i ] + 1; j++ ) { | |
|         poly_coef_int[ c ][ i ] [ j ] | se(v) |
|         poly_coef_frac[ c][ i ][ j ] | u(v) |
|       } | |
|     } else if( signal_reshape_model_id[ c ] = = 1 ) { | |
|       for( j = 0; j < 4; j++ ) { | |
|         pow_coef_int[ c ][ i ][ j ] | se(v) |
|         pow_coef_frac[ c ][ i ][ j ] | u(v) |
|       } | |
|     } else if( signal_reshape_model_id[ c ] = = 2 ) { | |
|       signal_reshape_target_pivot_value[ c ][ i ] | u(v) |
|       if( i = = signal_reshape_num_pivots_minus2 [ c ] ) | |
|         signal_reshape_target_pivot_value[ c ][signal_reshape_num_pivots_minus2 [ c ]+1] | u(v) |
|       } | |
|     } | |
|   } | |
| } | | signal_reshape_input_bit_depth_minus8 specifies the bit depth of color components of the associated pictures for purposes of interpretation of the signal reshaping information SEI message. When any signal reshaping information SEI messages is present with the value of signal_reshape_input_bit_depth not equal to the bit depth of the coded colour components, the SEI message refers to the hypothetical result of a transcoding operation performed to convert the coded video to a converted video with bit depth equal to signal_reshape_input_bit_depth. The value of signal_reshape_input_bit_depth_minus8 shall be in the range of 0 to 8, inclusive.

signal_reshape_bit_depth specifies the bit depth of the output of the signal reshaping function described by the signal reshaping information SEI message.

signal_reshape_full_range_flag has the same semantics as specified in clause E.3.1 of the HEVC specification for the video_full_range_flag syntax element, except that signal_reshape_full_range_flag specifies the colour space of the reshaped reconstructed picture, rather than the colour space used for the CLVS.

signal_reshape_model_present_flag equal to 1 specifies that syntax elements coef_log 2_denom_minus14, signal_reshape_model_id, signal_reshape_num_pivots_minus2, signal_reshape_coded_pivot_value, poly_order_minus1, poly_coef_int, poly_coef_frac, pow_coef_int, pow_coef_frac and signal_reshape_target_pivot_value are present. signal_reshape_model_present_flag equal to 0 specifies that syntax elements coef_log 2_denom_minus14, signal_reshape_model_id, signal_reshape_num_pivots_minus2, signal_reshape_coded_pivot_value, poly_order_minus1, poly_coef_int, poly_coef_frac, pow_coef_int, pow_coef_frac and signal_reshape_target_pivot_value are not present.

coeff_log 2_denom_minus14 plus 14 specifies the number of fractional bits for signal reshaping related coefficients. The value of coeff_log 2_denom_minus14 shall be in the range of 0 to 9, inclusive. When not present, the value of coeff_log 2_denom_minus14 is inferred to be equal to 0.

signal_reshape_model_id[c] specifies the model utilized for reshaping the coded data into the target value for the c-th component. Values greater than 3 are reserved for future use and shall not be present in bitstreams conforming to this version of this Specification. Decoders shall ignore all signal reshaping SEI messages that contain a value of signal_reshape_model_id[c] greater than 3 and bitstreams shall not contain such values. When not present, the value of signal_reshape_model_id[c] is inferred to be 0.

A signal_reshape_model_id of 0 corresponds to a polynomial reshaping; a signal_reshape_model_id of 1 corresponds to a power function reshaping; and signal_reshape_model_id of 2 corresponds to a user-defined table mapping. When signal_reshape_model_present_flag equal to 0, the reshaping model is set to be identity linear model with one piece for all three components.

signal_reshape_num_pivots_minus2[c] specifies the number of pivot points in the piece-wise signal reshaping function without counting the two default end points, 0 and $2^{signal\_reshape\_input\_bit\_depth}-1$. When not present, the value of signal_reshape_num_pivots_minus2[c] is inferred to be 0.

signal_reshape_coded_pivot_value[c][i] specifies the value of the i-th pivot point for the c-th component. The number of bits used for the representation of the signal_reshape_coded_pivot_value is ((signal_reshape_input_bit_depth_minus8+15)>>3)<<3. For the default two ending points, signal_reshape_coded_pivot_value[c][0] is set to 0 and signal_reshape_coded_pivot_value[c][signal_reshape_num_pivots_minus2[c]+1] is set to $2^{signal\_reshape\_input\_bit\_depth}-1$.

poly_order_minus1[c][i] plus 1 specifies the order of polynomial function for the i-th piece in the c-th component. The value of poly_order_minus1[c][i] shall be in the range of 0 to 1, inclusive. When not present, the value of poly_order_minus1[c][i] is inferred to be 0.

poly_coef_int[c][i][j] specifies the integer portion of fp_poly_coef[c][i][j]. When not present, the value of poly_coef_int[c][0][0] is inferred to be 0 and poly_coef_int[c][0][1] is inferred to be 1.

poly_coef_frac[c][i][j] specifies the fractional portion of fp_poly_coef[c][i][j]. When not present, the value of poly_coef_frac[c][0][0] is inferred to be 0 and poly_coef_frac[c][0][1] is inferred to be 0.

fp_poly_coef[c][i][j] specifies the floating point value of j-th order polynomial coefficients for the i-th piece in the c-th component.

$$fp\_poly\_coef[c][i][j] = (\text{float})(poly\_coef\_int[c][i][j] << (\text{coeff\_log 2\_denom\_minus14}+14) + poly\_coef\_frac[c][i][j])/(1 << (\text{coeff\_log 2\_denom\_minus14}+14))$$

$$fp\_s\_in = (\text{float})s\_in/(\text{float})((1 << \text{signal\_reshape\_input\_bit\_depth\_minus8}+8)-1)$$

$$fp\_s\_out = \sum_{k=0}^{poly\_order\_minus1+1} fp\_poly\_coef[c][i][j] * fp\_s\_in$$

$$s\_out = \text{Clip3}(0,((1 << \text{signal\_reshape\_bit\_depth\_minus8}+8)-1),\text{round}(fp\_s\_out*(\text{float})((1 << \text{signal\_reshape\_bit\_depth\_minus8}+8)-1))),$$

where s_in is the input sample value of for the i-th piece in the c-th color component and s_out is the output sample value of for the i-th piece in the c-th color component after reshaping.

pow_coef_int[c][i][j] specifies the integer portion of fp_pow_coef[c][i][j].

pow_coef_frac[c][i][j] specifies the fractional portion of fp_pow_coef[c][i][j].

fp_pow_coef[c][i][j] specifies the value of j-th coefficients for i-th piece in the c-th component.

$$fp\_pow\_coef[c][i][j] = (\text{float})(pow\_coef\_int[c][i][j] << (\text{coeff\_log 2\_denom\_minus14}+14) + pow\_coef\_frac[c][i][j])/(\text{float})(1 << (\text{coeff\_log 2\_denom\_minus14}+14))$$

$$fp\_s\_in = (\text{float})s\_in/(\text{float})((1 << \text{signal\_reshape\_input\_bit\_depth\_minus8}+8)-1)$$

$$fp\_s\_out = fp\_pow\_coef[c][i][2]*(fp\_s\_in - fp\_pow\_coef[c][i][0])^{fp\_pow\_coef[c][i][3]} + fp\_pow\_coef[c][i][1]$$

$$s\_out = \text{Clip3}(0,((1 << \text{signal\_reshape\_bit\_depth\_minus8}+8)-1),\text{round}(fp\_s\_out*(\text{float})((1 << \text{signal\_reshape\_bit\_depth\_minus8}+8)-1))),$$

where s_in is the input sample value of for the i-th piece in the c-th color component and s_out is the output sample value of for the i-th piece in the c-th color component after reshaping.

signal_reshape_target_pivot_value][c][i] specifies the reshaped value of the i-th pivot point for the c-th component. The number of bits used for the representation of the signal_reshape_target_pivot_value is ((signal_reshape_bit_depth_minus8+15)>>3)<<3.

As an example, to signal to a decoder that the encoder used the default XYZ to LMS and LMS to IPT matrices and to simply multiply by the P and T components by 2.0, the following parameters in Table 7 may be defined as:
signal_reshape_video_signal_type_present_flag=0//use default matrices
signal_reshape_model_present_flag=1
signal_reshape_model_id[c]=0, for c=0, 1, 2//polynomial-based reshaping
signal_reshape_num_pivots_minus2[c]=0, for c=0, 1, 2//one piece
poly_order_minus[c][i]=0; for i=0, c=0, 1, 2//first order polynomial (ax+b)
poly_coef_int[c][i][j]=1; for c=0, i=0; j=0;//No scaling for I (a=1)
poly_coef_int[c][i][j]=2; for c=1, 2; i=0, j=0//Scale P and T by 2 (a=2)
poly_coef_int[c][i][j]=0; for c=0, 1, 2; i=0, 1, 2; j=1; //Offset (b) for I, P and T is 0
poly_coef_frac[c][i][j]=0; for c=0, 1, 2; i=0, 1, j=0, 1//No fractions in the scaling factors and offsets.

In the above syntax, the sign of the coefficients is declared as part of the integer part of coefficients. In another embodiment, one can signal the sign explicitly and change the coding from se(v) to ue(v), where as defined by HEVC, se(v) denotes a signed integer 0-th order Exp-Golomb-coded syntax element with the left bit first, and ue(v) denotes unsigned integer 0-th order Exp-Golomb-coded syntax element with the left bit first.

If the same tool set is used for entire sequence, one can move the indicator to the sps_hdrwcg_extension( ) An example is shown below in Table 8.

TABLE 8

Example tool description in the SPS level.

| sps_hdrwcg_extension( ) { | Descriptor |
|---|---|
| ... | |
| adaptive_reshaping_enabled_flag | u(1) |
| if( adaptive_reshaping_enabled_flag ) { | |
| adaptive_reshaping_idc | ue(v) |
| } | |
| ... | |
| } | |

In some embodiments, HDR-related extensions may be allowed even at the picture slice layer, then one may also signal the syntax information of each HDR tool in the slice header, for example, in the HEVC slice_segment_header( ) structure.

In another embodiment, one may use a new Network Arbitration Layer (NAL) unit to indicate the HDR and WCG reconstruction process. For example, one may use one reserved number from the VCL NAL reserved numbers (22-31) or the Non-VCL NAL reserve number (41-47). To keep changes to the HEVC specification at a minimum, using a Non-VCL NAL might be preferred. The new NAL unit can follow the same procedure as PREFIX_SEI_NUT, except that the operation should be mandatory. The transmission of new NAL unit for each coding tool may be controlled by a flag in sps_hdrwcg_extension( ) Alternatively, following the supplemental enhancement information (SEI) way, one does not need any signaling in the SPS layer, but one can let the decoder parse the new NAL unit and decide what tools are enabled. The new NAL unit can be named as HRI (High Dynamic Range Reconstruction Information) NAL unit. As an example, the order of NAL units and coded pictures and their association to access units as defined in Section 7.4.2.4.4 of HEVC may be amended as follows, with proposed changes shown in bold:

access unit delimiter NAL unit with nuh_layer_id equal to 0 (when present),
VPS NAL unit with nuh_layer_id equal to 0 (when present),
SPS NAL unit with nuh_layer_id equal to 0 (when present),
PPS NAL unit with nuh_layer_id equal to 0 (when present),
HRI NAL unit with nuh_layer_id equal to 0 (when present),
Prefix SEI NAL unit with nuh_layer_id equal to 0 (when present), NAL units with nal_unit_type in the range of RSV_N-VCL41 . . . RSV_NVCL44 with nuh_layer_id equal to 0 (when present), NAL units with nal_unit_type in the range of UNSPEC48 . . . UNSPEC55 with nuh_layer_id equal to 0 (when present).

Given the options above, the use of pps_hdrwcg_extension( ) seems to have the smallest changes in the specification.

Preferably, a new Annex should be added to the HEVC specification to describe the HDR decoding and reconstruction process. The process should be able to describe a full set or a subset of the tools. A fixed point description is preferred.

In terms of HEVC Profile definitions, an HDR WCG Profile should include all tools in the Main 10 Profile and the HDR reconstruction process. For Level definition, depending on how to store HDR reconstructed pictures, MaxDpbSize might be impacted.

In accordance with the HEVC specification, the conformance point includes bitstream conformance and decoder conformance. Bitstream conformance includes Type-I and Type-II. Type-I only includes VCL NAL units and filler data NAL units. Type-II includes all kinds of NAL unit types. Bitstream conformance might not need any modification. For decoder conformance, it is suggested to keep both the decoded pictures and the HDR reconstructed pictures before they are output. In one embodiment, one can store both versions in the decoded picture buffer (DPB). In another embodiment, one may store only the decoded picture in the DPB and generate the corresponding HDR reconstructed picture after the decoded picture is bumped out from the DPB.

Another point to be considered is that HDR reconstruction is out of the coding loop. The processing most likely could be done with fixed point or LUT implementation. In case a different implementation is used to simplify the process, one might consider allowing some tolerance at the conformance point.

Figure 4:
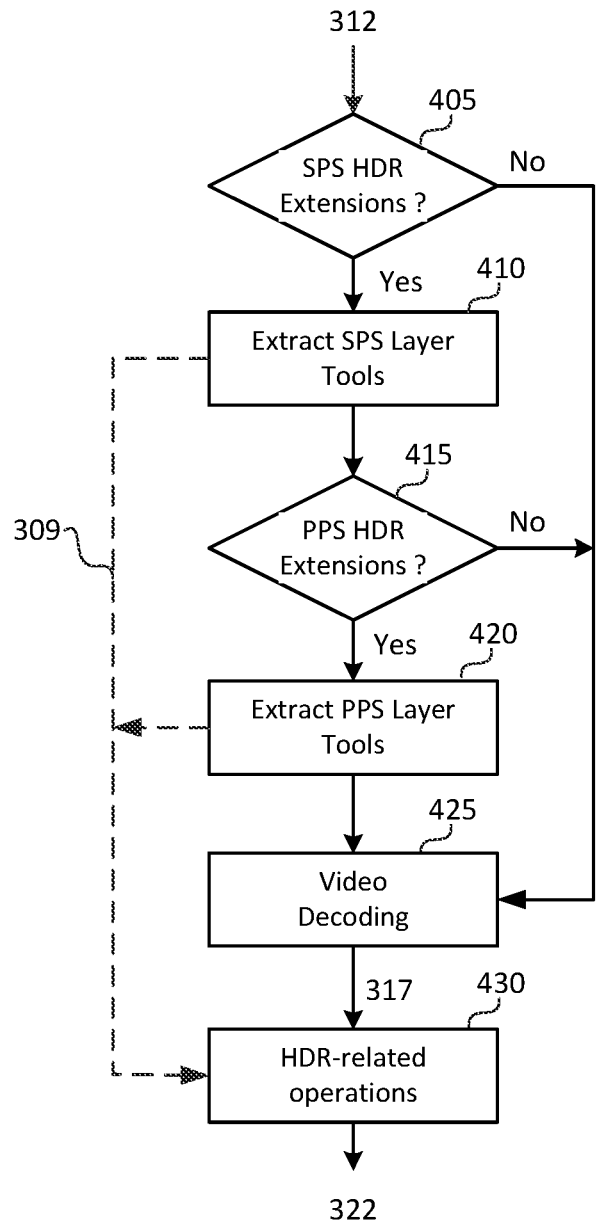
FIG. 4 depicts an example process for HDR bitstream decoding according to an embodiment of this invention.

FIG. 4 depicts an example process for HDR bitstream decoding according to an embodiment if this invention. As depicted in FIG. 4, in step (405), a decoder may search first to detect if the bitstream includes signals at the sequence parameter set (SPS) level (e.g., the sps_hdrwcg_extension_flag=1 flag) indicating special HDR-handling of the incoming bitstream (312). If no such signals are found, then the decoder proceeds with normal video decoding (425) and the post-decoding block (430) for HDR-related operations, such as backward reshaping, is skipped. If such signals are detected, then in step (410) the decoder extracts the appropriate tools and parameters (e.g., decoding of sps_hdrwcg_extension( )). HDR-related parameters (309) are stored and updated as needed to be used by the HDR-related post-processing block (430).

In some embodiments, a decoder may also search to identify HDR-related handling signals at the picture parameter set (PPS) level (415) (e.g., the pps_hdrwcg_extension_flag=1 flag). If no such signals are found, then the decoder proceeds with normal video decoding (425), otherwise in step (420) the decoder extracts the appropriate tools and parameters (309) (e.g., decoding of pps_hdrwcg_extension( )).

After video decoding (e.g. using HEVC Main 10 Profile and the like), the decoder uses the extracted HDR-related metadata (309) to perform any HDR-related post-processing (430).

Efficient Signaling of a Reshaping Function

As discussed earlier, in an embodiment, the reshaping function may be signalled from an encoder to a decoder as a piece-wise polynomial. The reshaping function and the polynomial parameters may be changed on a per scene, frame, slice, tile, or the like, interval, hence efficient coding of piece-wise polynomials within a coded bitstream is of high importance in video coding.

Figure 5:
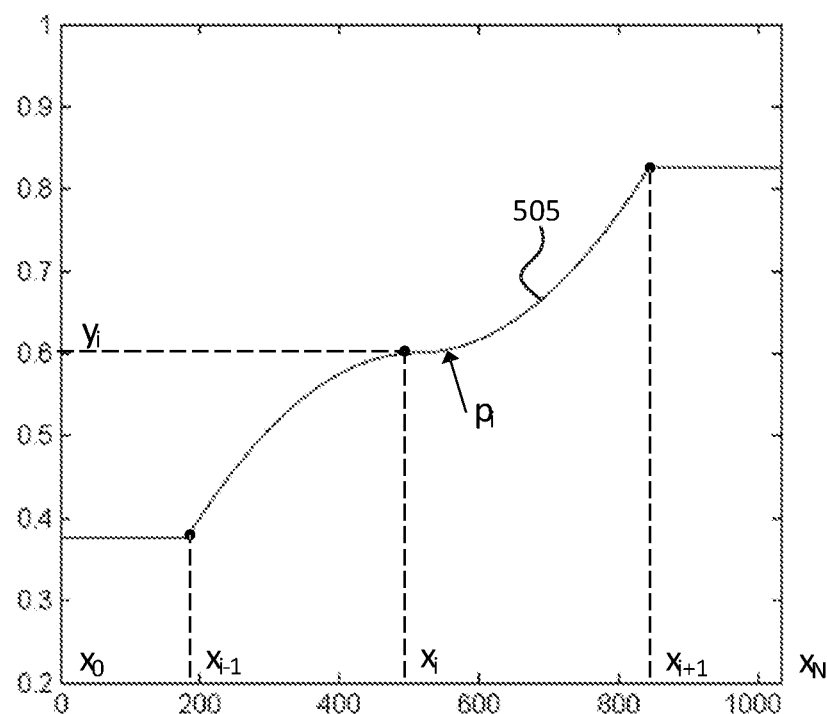
FIG. 5 depicts an example of a piece-wise polynomial with N segments according to an embodiment of this invention.

FIG. 5 depicts an example of a piece-wise polynomial with N=4 segments, determined by N+1 pivot points: $x_0$, $x_1, \ldots, x_N$. For each pivot point $x_i$, $i=0, \ldots, N-1$, the corresponding polynomial segment is denoted as $p_i$, and may be modeled as an $M_i$-th order polynomial $$y_{p_i} = \Sigma_{k=0}^{M_i} S_k^{(i)} x^k, \text{ for } x=[x_i, x_{i+1}), \quad (4)$$

where $M_i$ is the order of the polynomial segment $p_i$, and $S_k^{(i)}$, $k=0, 1, 2, \ldots M_i$, denotes the polynomial coefficients for the i-th segment.

Without loss of generality, let $M_i=2$, then equation (4) may be expressed as:

$$y = a_i + b_i x + c_i x^2, \text{ for } x=[x_i, x_{i+1}), \quad (5a)$$

or $$y = A_i + B_i (x-x_i) + C_i (x-x_i)^2, \text{ for } x=[x_i, x_{i+1}). \quad (5b)$$

Methods disclosed herein may be applied to either one of the representations in equation (5).

As described earlier, in an embodiment, all polynomial coefficients (e.g., $a_i$, $b_i$, and $c_i$) may be sent explicitly from an encoder to the decoder; however, by adding some simple constrains on the characteristics of the shaping function (505), a decoder may be able to reconstruct the polynomial parameters by receiving only a partial set of them.

In an embodiment, for a smooth reshaping curve, two additional constrains may be imposed:
(1) 0-th order continuity: the curve is continuous at the pivot points, that is, $y_{i-1}(x_i) = y_i(x_i)$;
(2) 1-st order continuity: for each pivot $x_i$, if both $p_{i-1}$ and $p_i$ are second order polynomials, then the first order derivative has to be smooth at $x_i$, or $y'_{i-1}(x_i) = y'_i(x_i)$ Based on these constrains, at $x=x_i$, from equation (5), for the first constrain:

$$a_{i-1} + b_{i-1} x_i + c_{i-1} x_i^2 = a_i + b_i x_i + c_i x_i^2 \quad (6a)$$

and for the second constrain:

$$b_{i-1} + 2c_{i-1} x_i = b_i + 2c_i x_i, \quad (6b)$$

From equations (6a) and (6b):

$$a_i = a_{i-1} + (b_{i-1} - b_i) x_i + (c_{i-1} - c_i) x_i^2, \quad (7a)$$

$$b_i = b_{i-1} + 2(c_{i-1} - c_i) x_i. \quad (7b)$$

From equations (7a) and (7b), one can make the following observations:
$a_i$ can always be reconstructed based on $a_{i-1}$, $b_{i-1}$, $b_i$, $c_{i-1}$, $c_i$, and $x_i$
$c_i$ needs to be signaled only if the segment is a second order polynomial (that is, $M_i=2$)
$b_i$ needs to be signaled only if 1-st order continuity is not satisfied, that is, when $M_i=2$, but $M_{i-1} \neq 2$, or when $M_i=1$.

As an example, consider a reshaping function determined using eight second order polynomials. Under typical practices, one would have to transmit three coefficients for each polynomial, for a total of 24 coefficients. Using the proposed method, if none of the eight polynomials is a first order or zero order polynomial, then only 10 coefficients need to be transmitted (three for the 0-th segment and one coefficient for the remaining seven segments).

Hence, a more efficient way to transmit reshaping-related parameters includes the following steps:

```
For i=0 to N, signal pivot points x_i
Let M_i denotes the maximum polynomial order of the i-th segment, where
  M_i < 3.
For segment p_0, signal a_0, b_0, or c_0, up to M_0
for each segment p_i, i = 1 ... N-1
    if M_i == 2 {
        signal c_i
``` implied that $c_i=0$ (612). If $M_i=1$, then 1-st order continuity can't be satisfied and the decoder requires to receive $b_i$ (608), otherwise, $M_i=0$ implies that $b_i=0$ (616). Given $c_i$ and $b_i$, and based on 0-th order continuity, $a_i$ can be computed as in equation (7) (618).

If $M_i=2$, then the decoder reads $c_i$ (604). If $M_{i-1} \neq 2$ and $M_i=2$, then 1-st order continuity can't be satisfied and the decoder requires to receive $b_i$ (608), otherwise $b_i$ can be estimated using equation (7) (610). In either case, $a_i$ can be computed as in equation (7) (618).

Table 9 depicts an example HEVC syntax for signaling a reshaping function as N segments according to an embodiment

TABLE 9

Example syntax for signaling a reshaping function

| hdr_reshape_pps_table( ) { | Descriptor |
|---|---|
|   reshape_present_flag | ue(v) |
|   if( reshape_present_flag ) { | |
|     reshape_input_luma_bit_depth_minus8 | ue(v) |
|     reshape_input_chroma_bit_depth_minus8 | ue(v) |
|     reshape_output_luma_bit_depth_minus8 | ue(v) |
|     reshape_output_chroma_bit_depth_minus8 | ue(v) |
|     coef_log2_denom_minus14 | ue(v) |
|     for( c = 0; c < 3; c++ ) { | |
|       reshape_num_pivots_minus2 [ c ] | ue(v) |
|       for( i = 0; i < reshape_num_pivots_minus2 [ c ] + 2 ; i++ ) { | |
|         reshape_coded_pivot_value[ c ][ i ] | u(v) |
|       } | |
|       for( i = 0; i < reshape_num_pivots_minus2 [ c ] + 1; i++ ) { | |
|         reshape_poly_order_minus1[ c ] [ i ] | ue(v) |
|       } | |
|       for ( j = 0 ; j <= reshape_poly_order_minus1[ c ] [ 0 ] + 1 ; j++) { | |
|         poly_coef_frac[ c ][ 0 ][ j ] | se(v) |
|         poly_coef_int[ c ][ 0 ] [ j ] | u(v) |
|       } | |
|       for( i = 1; i < reshape_num_pivots_minus2 [ c ] + 1 ; i++ ) { | |
|         if (reshape_poly_order_minus1[ c ] [ i ] = = 1 ) { | |
|           poly_coef_frac[ c ][ i ][ 2 ] | se(v) |
|           poly_coef_int[ c ][ i ] [ 2] | u(v) |
|           if (reshape_poly_order_minus1[ c ] [ i - 1 ] != 1) { | |
|             poly_coef_frac[ c ][ i ][ 1 ] | se(v) |
|             poly_coef_int[ c ][ i ] [ 1 ] | u(v) |
|           } | |
|         } | |
|         elseif (reshape_poly_order_minus1[ c ] [ i ] = = 0) { | |
|           poly_coef_frac[ c ][ i ][ 1 ] | se(v) |
|           poly_coef_int[ c ][ i ] [ 1 ] | u(v) |
|         } | |
|       } // for each piece i | |
|     } // for each component c | |
|   } else | |
|     reshape_pps_id | ue(v) |
| } | |

-continued

```
        if M_{i-1} != 2
            signal b_i
        else
            b_i = b_{i-1} + 2(c_{i-1} - c_i)x_i
    }
    else {
        c_i = 0
        if M_i == 1
            signal b_i
        else
            b_i = 0
    }
    a_i = a_{i-1} + (b_{i-1} - b_i)x_i + (c_{i-1} - c_i)x_i^2
```

Figure 6:
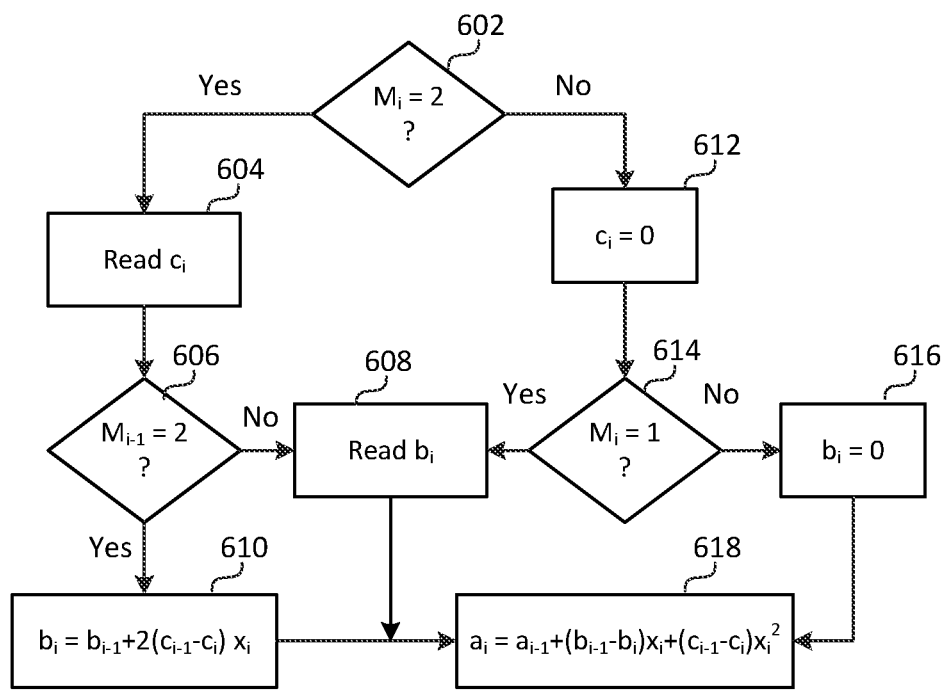
FIG. 6 depicts an example of reconstructing the parameters for a segment of a reshaping function which is expressed as a piece-wise polynomial according to an embodiment of this invention.

FIG. 6 depicts an example process in a decoder to reconstruct the polynomial coefficients of the reshaping function according to an embodiment. If $M_i \neq 2$, then it is reshape_present_flag equal to 1 specifies that syntax elements reshape_input_luma_bit_depth_minus8, reshape_input_chroma_bit_depth_minus8, reshape_output_luma_bit_depth_minus8, reshape_output_chroma_bit_depth_minus8, coef_log 2_denom_minus14, reshape_num_pivots_minus2, reshape_coded_pivot_value, poly_order, poly_coef_int, poly_coef_frac and reshape_pps_id are present. reshape_present_flag equal to 0 specifies that syntax elements reshape_input_luma_bit_depth_minus8, reshape_input_chroma_bit_depth_minus8, reshape_output_luma_bit_depth_minus8, reshape_output_chroma_bit_depth_minus8, coef_log 2_denom_minus14, reshape_num_pivots_minus2, reshape_coded_pivot_ value, poly_order, poly_coef_int, poly_coef_frac and reshape_pps_id are not present.

reshape_input_luma_bit_depth_minus8 specifies the sample bit depth of the input luma component of the HDR reshaping process.

reshape_input_chroma_bit_depth_minus8 specifies the sample bit depth of the input chroma component of the HDR reshaping process.

The variable BitDepthReshapeInput[c] is derived as follows: BitDepthReshapeInput[c]=8+(c==0)? reshape_input_luma_bit_depth_minus8: reshape_input_chroma_bit_depth_ minus8 reshape_output_luma_bit_depth_minus8 specifies the sample bit depth of the output luma component of the HDR reshaping process.

reshape_output_chroma_bit_depth_minus8 specifies the sample bit depth of the output chroma component of the HDR reshaping process.

The variable BitDepthReshapeOutput[c] is derived as follows: BitDepthReshapeOutput[c]=8+(c==0)? reshape_output_luma_bit_depth_minus8: reshape_output_chroma_bit_depth_minus8 coef_log 2_denom_minus14 plus 14 specifies the number of fractional bits for HDR reshaping related coefficients calculations for the color component c, the value of coef_log 2_denom_minus14 shall be in the range of 0 to 9, inclusive. The variable ReshapeLog 2Denom is derived as follows:

ReshapeLog 2Denom=14+coef_log 2_denom_minus14 reshape_num_pivots_minus2[c] plus 2 specifies the number of pivot points in the piece-wise reshaping function including the two end points. When not present, the value of reshape_num_pivots_minus2[c] is inferred to be 0. reshape_num_pivots_minus2[c] shall be in the range of 0 to 7, inclusive for luma component and in the range of 0 to 3, inclusive for chroma component.

reshape_coded_pivot_value[c][i] specifies the value of the i-th pivot point for the c-th component. The number of bits used for the representation of the reshape_coded_pivot_value is BitDepthReshapeInputL for luma component and BitDepthReshapeInputC for chroma component. When not present, the value of reshape_coded_pivots_value[c][0] and reshape_coded_pivots_value[c][1] are inferred based on video_full_range_flag. It is a requirement of bitstream conformance that, for c in the range of 0 to 2, inclusive, and i in the range of 0 to reshape_num_pivots_minus2[c]+1, inclusive, the following shall be true:

reshape_coded_pivots_value[c][i+1]>reshape_coded_pivots_value[c][i]

reshape_poly_order_minus1[c][i] plus 1 specifies the maximum order of the i-th piece for the c-th component. The value of reshape_poly_order_minus1 shall be in the range of −1 to 1, inclusive.

poly_coef_int[c][i][j] specifies the integer value of the i-th piece j-th order polynomial coefficient for component c. The value of poly_coef_int[c][i][j] shall be in the range of −64 to 63, inclusively.

poly_coef_frac[c][i][j] specifies the fractional value of the i-th piece j-th order polynomial coefficient for component c. The variables PolyCoef[c][0][j] with c in the range of 0 to 2, inclusive, j in the range of 0 to 2 inclusive, are derived as follows:

```
for ( j = 0; j <= 2; j++ ) {
    if ( j <= reshape_poly_order_minus1 [ c ][ 0 ] + 1) {
        PolyCoef[ c ][ 0 ][ j ] = ((poly_coef_int[ c ][ 0 ][ j ] <<
            ReshapeLog2Denom) +
            poly_coef_frac[ c ][ 0 ][ j ])
    }
    else {
        PolyCoef[ c ][ 0 ][ j ] = 0
    }
}
```

The variables PolyCoef[c][i][j] with c in the range of 0 to 2, i in the range of 1 to reshape_num_pivots_minus2[c], and j in the range of 0 to 2, inclusive are derived as follows:

```
for(i = 1; i < reshape_num_pivots_minus2[ c ] + 1; i ++) {
    if (reshape_poly_order_minus1[ c ][ i ] = = 1 ) {
        PolyCoef[ c ][ i ][ 2 ] = ((poly_coef_int[ c ][ i ][ 2 ] << ReshapeLog2Denom) +
            poly_coef_frac[ c ][ i ][ 2 ])
        if (reshape_poly_order_minus1[ c ][ i −1 ] ! = 1) {
            PolyCoef[ c ][ i ][ 1 ] = ((poly_coef_int[ c ][ i ][ 1 ] << ReshapeLog2Denom) +
                poly_coef_frac[ c ][ i ][ 1 ])
        }
        else {
            PolyCoef[ c ][ i ][ 1 ] = (PolyCoef[ c ][ i−1 ][ 1 ] <<
                BitDepthReshapeInput[ c ] +
                (reshape_coded_pivot_value[ c ][ i ]<<1)*( PolyCoef[ c ][ i−
                1 ][ 2 ] − PolyCoef[ c ][ i ][ 2 ] ) + (1 <<
                (BitDepthReshapeInput[ c ] − 1)) >>
                BitDepthReshapeInput[ c ] )
        }
    }
    else {
        PolyCoef[ c ][ i ][ 2 ] = 0
        if(reshape_poly_order_minus1[ c ][ i ] = = 0) {
            PolyCoef[ c ][ i ][ 1 ] = ((poly_coef_int[ c ][ i ][ 1 ] << ReshapeLog2Denom) +
                poly_coef_frac[ c ][ i ][ 1 ])
        }
        else {
            PolyCoef[ c ][ i ][ 1 ] = 0
        }
    }
```

-continued

```
}
    PolyCoef[ c ][ i ][ 0 ] = (PolyCoef[ c ][ i - 1 ][ 0 ] << (2* BitDepthReshapeInput[ c ]) +
        (( PolyCoef[ c ][ i - 1 ][ 1 ] - PolyCoef[ c ][ i ][ 1 ])*
        reshape_coded_pivot_value[ c ][ i ]) << (BitDepthReshapeInput[ c ])
        + ( PolyCoef[ c ][ i - 1 ][ 2 ] - PolyCoef[ c ][ i ][ 2 ] )*
        reshape_coded_pivot_value[ c ][ i ]
        *reshape_coded_pivot_value[ c ][ i ] + (1 << (2*
        BitDepthReshapeInput[ c ]- 1))) >> (2* BitDepthReshapeInput[ c ])
}
``` reshape_pps_id specifies the value of the referred pps_pic_parameter_set_id which contains the reshaping information. When not present, the value of reshape_pps_id is inferred to be 0. It is required that the PPS which has reshape_pps_id shall have reshape_present_flag equal to 1. (Note: The purpose of this syntax is to reuse the pps_id which already contains reshaping information. This is especially useful when PPS contains some function which is changing very frequently while reshaping is only updated during a scene change.)

Identification of Piecewise Function Index
Inputs to this process are a sample value S and the component index c.
Output of this process is an index idxS identifying the segment to which the sample S belongs. The variable idxS is derived as follows:

```
if( ( S < reshape_coded_pivot_value[ c ][ 0 ] )
    S = reshape_coded_pivot_value[ c ][ 0 ]
else if(S > reshape_coded_pivot_value[ c ][
    reshape_num_pivots_minus2 + 1] )
    S = reshape_coded_pivot_value[ c ][
        reshape_num_pivots_minus2 + 1]
for( idxS = 0, idxFound = 0; idxS < reshape_num_pivots_minus2 + 1;
idxS++ ) {
    if( S < reshape_coded_pivot_value[ c ][idxS + 1] ) {
        idxFound = 1
        break
    }
}
if ( ! idxFound)
    idxS = idxS - 1
```

HDR Reshaping Process of Luma Sample Values
Inputs to this process is a luma location (xP, yP) specifying the luma sample location relative to the top-left luma sample of the current picture.
Outputs of this process is an hdr reshaped luma sample value reshapeLumaSample.
The value of reshapeLumaSample is derived by applying the following ordered steps:
1. The variables idxL is derived by invoking the identification of piece-wise function index with the input of sample value recPictured$_L$[xP][yP] for component 0.
2. The value of reshapeLumaSample is derived as follows:

reshapeLumaSample=((PolyCoef[0][idxL][0]<<
(MaxReshapeOrder*Bit DepthReshapeInput
[0])+(PolyCoef[0][idxL][1]*(recPictured$_L$[xP]
[yP]<<BitDepthResh apeInput[0])+(PolyCoef
[0][idxL][2]*recPictured$_L$[xP][yP]*recPictured$_L$
[xP][yP]))>>(ReshapeLog 2Denom[0]+
MaxReshapeOrder*BitdepthReshapeInput[0]-
BitdepthReshapeOutput[0])

reshapeLumaSample=Clip3(0,(1<<BitDepthReshape-
Output[0])-1,reshapeLumaSample

HDR Reshaping Process of Chroma Sample Values
Inputs to this process is a luma location (xP$_C$, yP$_C$) specifying the chroma sample location relative to the top-left chroma sample of the current picture and a variable cIdx specifying the chroma component index.
Outputs of this process is a hdr reshaped chroma sample value reshapeChromaSample. recPicture$_C$ is set equal to recPicture$_{C0}$ if cIdx is equal to 0 and set equal to recPicture$_{C0}$ otherwise.
The value of reshapeChromaSample is derived as follows:
1. The variables idxC is derived by invoking the identification of piece-wise function index with the input of sample value recPicture$_C$[xP$_C$][yP$_C$] for component cIdx+1.
2. The value of reshapeChromaSample is derived as follows:

reshapeChromaSample=((PolyCoef[cIdx+1][idxC][0]
<<(MaxReshapeOrder*BitDepthRes hapeInput
[cIdx+1])+(PolyCoef[cIdx+1][idxC][1]*(recPic-
ture$_C$[xP$_C$][yP$_C$]<<BitDepth ReshapeInput[cIdx+
1]))+(PolyCoef[0][idxC][2]*recPicture$_C$[xP$_C$]
[yP$_C$]*recPicture$_C$[xP$_C$][yP$_C$])>>(ReshapeLog
2Denom[cIdx+1]+
MaxReshapeOrder*BitdepthReshapeInput[cIdx+
1]

reshapeChromaSample=Clip3(0,(1<<Bit-
DepthReshapeOutput[cIdx+1]-1,reshapeChro-
maSample)

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to signal reshaping and coding of images with enhanced dynamic range, such as those described herein. The computer and/or IC may compute any of a variety of parameters or values that relate to the signal reshaping and coding processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to signal reshaping and coding of HDR images as described above by executing software instructions in a program memory accessible to the processors. The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to the efficient signal reshaping and coding of HDR images are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A decoder for generating high-dynamic range video data, wherein the decoder comprises one or more processors and non-transitory memory, wherein generating an output image with the decoder comprises:
   receiving an input bitstream comprising sequence processing set (SPS) data and storing at least a portion of the SPS data in the non-transitory memory;
   parsing the SPS data; and upon detecting that an HDR extension syntax structure is present in the parsed SPS data:
   extracting from the HDR extension syntax structure post-processing information comprising an SDR viewable flag and one or more of a color space enabled flag, a color enhancement enabled flag, an adaptive reshaping enabled flag, a dynamic range conversion flag, or a color correction enabled flag, wherein the SDR viewable flag indicates whether a decoded version of the input bitstream is directly viewable on a standard dynamic range (SDR) display;
   decoding the input bitstream to generate a preliminary output decoded signal; and
   generating a second output signal based on the preliminary output signal and the post-processing information;
   wherein the adaptive reshaping enabled flag indicates that information related to adaptive reshaping is present,
   wherein the information related to adaptive reshaping comprises reshaping function parameters to determine a reshaping function based on one or more polynomial functions, and
   wherein the reshaping function parameters comprise:
   a first parameter based on a total number of polynomial functions used to define the reshaping function, and for each ($p_i$) polynomial function in the reshaping function, further comprising:
     a starting pivot point for the polynomial function;
     a second parameter based on an order of the polynomial function, wherein the order of the polynomial function can't exceed the value of two; and
     one or more non-zero coefficients for the polynomial function.

2. The decoder of claim 1, wherein the color space enabled flag indicates that color space information is present.

3. The decoder of claim 2, wherein the color space information comprises information related to color transformation matrices.

4. The decoder of claim 1, wherein the HDR extension syntax structure comprises a color space ID flag.

5. The decoder of claim 4, wherein a value of the color space ID flag equal to zero indicates that a processing color space is defined in another part of the input bitstream and a non-zero value of the color space ID flag indicates the processing color space.

6. The decoder of claim 1, wherein, for a first polynomial function in the reshaping function following a second adjoining polynomial function, coefficients for the first polynomial function, the first polynomial function and the second polynomial function each having an order, comprise:
   a second order coefficient ($c_i$), if the order of the first polynomial function is two; and
   a first order coefficient ($b_i$), if the order of the first polynomial function is two and the order of the second polynomial function is not two, or if the order of the first polynomial function is one.

7. The decoder of claim 6, wherein if the coefficients for the first polynomial function do not include the first order coefficient ($b_i$), then if the order of the first polynomial function is two, the first order coefficient is computed based on the first order and second order coefficients of the second polynomial function, the third order coefficient of the first polynomial function, and the starting pivot point for the first polynomial function.

8. The decoder of claim 6, wherein a zero order coefficient ($a_i$) for the first polynomial function is computed based on the coefficients of the second polynomial function, the second order and third order coefficients of the first polynomial function, and the starting pivot point for the first polynomial function.

9. The decoder of claim 1, further comprising:
   parsing picture processing set (PPS) data in the input bitstream; and upon detecting that a picture-HDR extension syntax structure is present in the parsed PPS data,
   extracting from the picture-HDR extension syntax structure post-processing information for one or more pictures in the input bit stream.

10. The decoder of claim 1, further comprising:
parsing slice header data in the input bitstream; and upon detecting that a slice-HDR extension syntax structure is present in the parsed slice header data,
extracting from the slice-HDR extension syntax structure post-processing information for one or more picture slices in the input bit stream.

11. The decoder of claim 1, wherein the decoding of the input bitstream is performed based on the HEVC standard specification.

12. The decoder of claim 1, wherein a decoder conformance point for a compliant decoder is defined after generating the second output signal.

13. A method for generating high-dynamic range video data with a decoder, the method comprising:
receiving an input bitstream comprising sequence processing set (SPS) data and storing at least a portion of the SPS data in the non-transitory memory;
parsing the SPS data; and upon detecting that an HDR extension syntax structure is present in the parsed SPS data:
extracting from the HDR extension syntax structure post-processing information comprising one or more of a color space enabled flag, a color enhancement enabled flag, an adaptive reshaping enabled flag, a dynamic range conversion flag, a color correction enabled flag, or an SDR viewable flag;
decoding the input bitstream to generate a preliminary output decoded signal; and
generating a second output signal based on the preliminary output signal and the post-processing information;
wherein the adaptive reshaping enabled flag indicates that information related to adaptive reshaping is present,
wherein the information related to adaptive reshaping comprises reshaping function parameters to determine a reshaping function based on one or more polynomial functions, and
wherein the reshaping function parameters comprise:
a first parameter based on a total number of polynomial functions used to define the reshaping function, and for each ($p_i$) polynomial function in the reshaping function, further comprising:
a starting pivot point for the polynomial function;
a second parameter based on an order of the polynomial function, wherein the order of the polynomial function can't exceed the value of two; and
one or more non-zero coefficients for the polynomial function.

14. A non-transitory computer-readable storage medium having stored thereon computer-executable instructions for executing a method with one or more processors in accordance with claim 13.

* * * * *